United States Patent [19]

Hughes

[11] 3,882,544

[45] May 6, 1975

[54] COMBINED WIDE-ERASE AND READ-WRITE MAGNETIC HEAD

[75] Inventor: Gordon Frierson Hughes, Los Angeles, Calif.

[73] Assignee: Xerox Corporation, Stamford, Conn.

[22] Filed: Dec. 14, 1973

[21] Appl. No.: 424,871

[52] U.S. Cl. ................ 360/118; 360/119; 360/122; 360/125

[51] Int. Cl. ........................... G11b 5/26; G11b 5/28

[58] Field of Search .............. 179/100.2 D, 100.2 C; 340/174.1 F; 346/74 MC; 360/121, 118, 125, 122, 119

[56] References Cited

UNITED STATES PATENTS

| | | | |
|---|---|---|---|
| 2,475,421 | 7/1949 | Camras | 179/100.2 D |
| 2,635,149 | 4/1953 | Cain | 179/100.2 D |
| 2,702,835 | 2/1955 | Camras | 179/100.2 D |
| 2,785,232 | 3/1957 | Camras | 179/100.2 C |
| 3,334,192 | 8/1967 | Camras | 179/100.2 C |
| 3,449,529 | 6/1969 | Camras | 179/100.2 D |
| 3,582,571 | 6/1971 | Sprott | 179/100.2 D |

*Primary Examiner*—Alfred H. Eddleman
*Attorney, Agent, or Firm*—James J. Ralabate; John E. Beck; Franklyn C. Weiss

[57] ABSTRACT

A pre-erase magnetic recording head of constant width, with a relatively long erase gap for producing erasing magnetic fields which fringe beyond the width of the erase gap. The erased portion of the recording track is then wider than the width of the head, which eliminates cross-talk between recorded tracks. A plurality of embodiments constructed in accordance with different fabrication techniques are described.

9 Claims, 6 Drawing Figures

COMBINED WIDE-ERASE AND READ-WRITE MAGNETIC HEAD

BACKGROUND OF THE INVENTION

1. Field of the Invention

The present invention relates generally to magnetic recording heads and, more particularly, to such heads with erase and read-write gaps combined in a single head unit.

2. Description of the Prior Art

In the field of magnetic recording heads, particularly those for use with magnetic drum or disc memory systems, alignment of the erase head with the read-write head becomes critical as the density of recording tracks is increased. Misalignment of the heads with the tracks can result in "cross-talk" between tracks due to incomplete erasure of prerecorded data or, overlapping of recorded tracks when data is written.

A conventional solution to this problem is to erase a section of the drum or disc which is wider than the track which will be subsequently recorded or written, thereby providing erased strips on either side of the recorded track so that slight misalignment of the read head during playback will not produce cross-talk. Many approaches have been taken to provide the wider erased track prior to writing data. The simplest approach is to provide a separate erase head with a gap wider than the gap of the read-write head as illustrated in U.S. Pat. No. 2,857,585. Another approach is to provide a write head with small erase heads straddling the write gap at each end to simultaneously erase a narrow band on each side of the written data as is illustrated in U.S. Pat. No. 3,485,958. This configuration is commonly known as a "straddle" erase head.

As the recording track density increases, correspondingly decreasing the recording head size, configurations of separate erase heads or a straddle erase head become difficult to use or fabricate. One other approach in a combined erase and read-write head utilizes a wedge shaped head with the erase gap being formed in the wider section of the wedge to provide a wider gap than the read-write gap. Again, while this technique permits erasure of small sections on either side of the recorded track, the wedge shaped head is difficult and costly to manufacture and align.

Thus, there has long been a need for a combined wide erase and read-write head which will reliably erase sections on either side of the recorded track and, further, was relatively inexpensive and easy to manufacture. The present invention satisfies that need.

SUMMARY OF THE INVENTION

The magnetic head of the present invention provides a combined wide erase and read-write head in which the erase gap and the read-write gap are the same width, and the wide erase function is effected by employing an erase gap which is relatively longer, measured along the longitudinal dimension of the head, than the read-write gap. This results in the erasing energy fringing outwardly from the ends of the erase gap to provide an effective erase path wider than the physical width of the gap itself. The relatively long erase gap also results in an erasure deeper into the recording track magnetic media to insure complete erasure of the prior recorded data. By controlling the erase gap length and the erasing energy, the effective erase width can be accurately determined.

A combined erase and read-write recording head constructed in accordance with the present invention is relatively easy and simple to manufacture in that the ferrite wafer which forms the main section of the head need only be of one width thereby greatly simplifying the conventional "slicing" and lapping processes used to fabricate the wafer. Further, the fabrication techniques of the present invention include attachment of additional ferrite sections to the main wafer to greatly improve the structural integrity and the magnetic characteristics of the head. In a particular described construction technique, the main wafer is constructed with an open magnetic circuit to permit a pre-assembled coil to be simply slid over a section of the magnetic circuit for the erase and the read-write sections of the head. The magnetic circuit is then completed by attaching an auxiliary ferrite section across the originally open sections of the magnetic circuits.

The fabrication technique incorporating the auxiliary ferrite pieces permits the construction of a number of different head configurations from a basic wafer configuration. Thus, a great number of magnetic head configurations can be assembled from a relatively small number of basic building elements. A particular desired fabrication method may then be advantageously chosen and a presently preferred method is described.

Thus, the present invention provides a combined wide-erase and read-write head of constant physical width, in which the wide erase function is provided by a relatively long erase gap producing an erasing fringe field beyond the ends of the gap. The fabrication technique of the invention permits greatly simplified assembly of the head into a number of different configurations providing variable magnetic characteristics. Other advantages of the present invention will become obvious from the following detailed description.

DESCRIPTION OF THE PREFERRED EMBODIMENT

Figure 1:
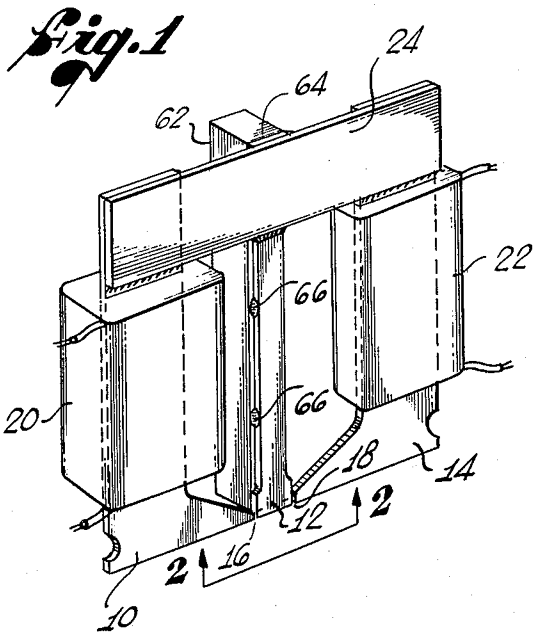
FIG. 1 is a perspective view of an assembled first embodiment of the combined erase and read-write head of the present invention.

Turning now to the drawings, and particularly FIG. 1 thereof, a combined erase and read-write magnetic head is shown constructed in accordance with the present invention. Some of the details of construction are in accordance with well-known fabrication techniques which form no part of the present invention and will only be briefly described herein as background information.

The basic construction begins with three elongated blocks of a suitable material such as a ferrite composition with the blocks having cross-sectional shapes corresponding to a read-write magnetic pole piece 10, a central or common pole piece 12, and an erase pole piece 14. The blocks are assembled in a suitable jig and aligned so that a read-write gap 16 appears between the read-write pole piece 10 and the common pole piece 12 and an erase gap 18 appears between the erase pole piece 14 and the common pole piece 12. A suitable fusing material such as glass is then placed between the read-write and erase pole pieces 10 and 14 respectively, and the common pole piece 12 and the assembly is fired to fuse the glass between the pole pieces to form a bonded unit with the read-write and erase gap (16 and 18) spacing maintained by the fused glass.

A head is formed by cross-sectionally slicing a wafer from the assembled blocks, sliding a read-write coil 20 over the read-write pole piece 10, sliding an erase coil 22 over the erase pole piece 14 and then completing the magnetic circuits by securing a ferrite cross bar 24 across the open ends of the read-write common and erase pole pieces 10, 12 and 14 respectively. The bar 24 is secured by any suitable means such as an epoxy glue.

Figure 3:
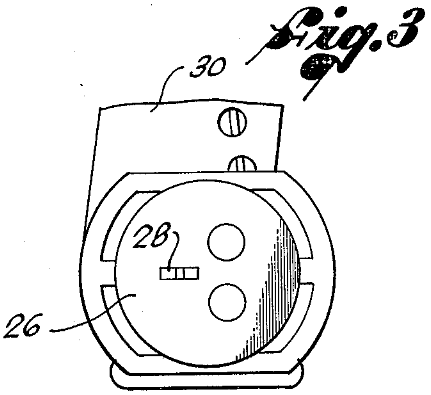
FIG. 3 is a fragmentary view of a magnetic head constructed in accordance with the present invention as typically mounted on a head pad and arm.

The assembled head is then mounted in a standard head pad 26 (FIG. 3) with the recording surface 28 of the head flush with the surface of the pad. The pad 26 is then conventionally mounted on a head carrier arm 30 only a portion of which is shown in FIG. 3.

Figure 2:
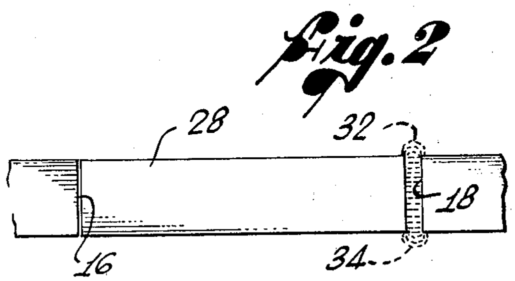
FIG. 2 is an enlarged fragmentary bottom view of the head taken in the direction of lines 2—2 of FIG. 1 showing a diagrammatic representation of the fringing effect of the erase gap.

FIG. 2 is an enlarged view of the head recording surface 28 in the vicinity of the read-write gap 16 and the erase gap 18. A feature of the present invention is that the erase gap 18 is unusually long, measured along the longitudinal dimension of the head recording surface, so that the erasing magnetic field fringes outwardly beyond the open ends of the gap as illustrated by the dotted lines at 32 and 34 which represent the magnetic field in the erase gap. The fringe fields are of sufficient strength to erase any prior data on the magnetic media or disc, creating an erased track which is wider than the track which will be recorded by the read-write gap 16. Thus, the process of erasure and then recording produces a recorded track with a controlled erased, but unrecorded, strip on either side of the recorded track to prevent cross-talk from adjacent or previous recorded tracks when the newly recorded data is read.

The effective width of the erased track is dependent upon the amount of fringing which occurs at the open ends of the erase gap 18. The amount of fringing is determined by the gap length with a greater length permitting increased fringing, and upon the level of erasing energy applied to the erase gap 18 itself. As the length of the gap 18 is increased, the fringing takes place not only further beyond the ends of the gap 18, but the depth of penetration of the erasing field into the magnetic media also increases. Therefore, the relatively long erase gap 18 insures a more positive erasure of the previously recorded data than was heretofor possible.

While the chosen dimensions of the read-write gap 16 and erase gap 18 depend on a number of analytical factors in the design of a particular head, an example will illustrate the relative dimensions for achieving the wide erase effect of the erase gap 18. On a magnetic head with a recording surface 28 which is 3.8 milli-inches wide, the read-write gap length is 90 micro-inches while the erase gap length is approximately 2 milli-inches. Thus, the erase gap 18 length is approximately half of the width of the head itself while the read-write gap 16 length is only a little more than two hundredths of the width of the head.

Figure 4:
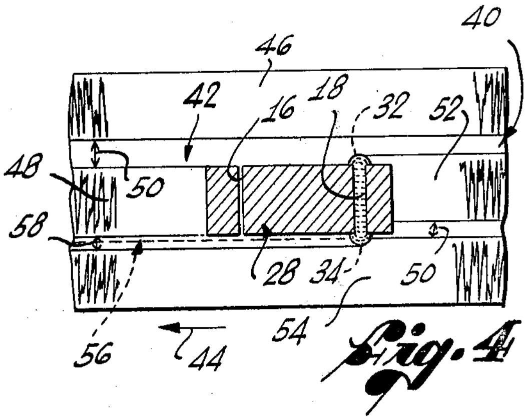
FIG. 4 is a fragmentary diagrammatic view of the operation of the magnetic head of the invention on a magnetic recording medium.

The operation of the combined erase and read-write head is illustrated in FIG. 4 in which the erase gap 18, the recording surface 28 and the read-write gap 16 are shown as a diagrammatic cross-section superimposed on a fragment of a recording media surface 40. The recording surface 28 conventionally remains motionless while the media surface moves in a direction which carries the media first past the erase gap 18 and then past the read-write gap 16 (in the direction of arrow 44 in FIG. 4).

A just recorded track 46 is shown adjacent a presently recorded track 48 with a predetermined unrecorded strip 50 between them. The presently recorded track 48 is being recorded over a first prior recorded track 52 which is shown adjacent to a second prior recorded track 54. Track 52 was spaced from track 54 with the same strip 50 when originally recorded.

The recording surface 28 is shown offset from the first prior recorded track 52 to illustrate the effect of a slight misalignment of the head with the prior tracks when recording. Without the fringe erase fields 32 and 34 the presently recorded track 48 would be very close to the second prior recorded track 54 as indicated by the dotted line 56. However the fringe erase field 34 erases a small portion of the second prior recorded track 54 together with the first prior recorded track 52 ensuring a minimum erased strip 58 between the tracks.

The erasure of the small portion of the second prior recorded track 54 may or may not affect the subsequent playback level of the track 54 but, for the intended purposes of the present invention, a slight loss of playback level is more acceptable than the track cross-talk which could result if the presently recorded track 48 were permitted to remain as close to the second prior recorded track 54 as indicated by dotted line 56.

Returning now to FIG. 1, which illustrates a basic embodiment of a magnetic head incorporating the features of the present invention, it is an additional feature of the invention that the structural integrity as well as the magnetic properties of the head are improved by attaching an additional vertical side piece 62 to a side 64 of the common pole piece 12 opposite the cross-bar 24. The vertical side piece 62 is attached to the common pole piece 12 at spaced points 66 by means of some suitable adhesive, such as epoxy. The additional vertical side piece 62 then increases the magnetic material in an area where both magnetic circuits of the read-write coil 20 and the erase coil 22 couple together, to reduce mutual interference, and improve efficiency. The side piece 62 at the same time strengthens the rather thin wafers of the head. The side piece 62 does not extend completely to the head recording surface 28 so that the configuration of the recording surface remains as illustrated in FIG. 2.

Figure 5:
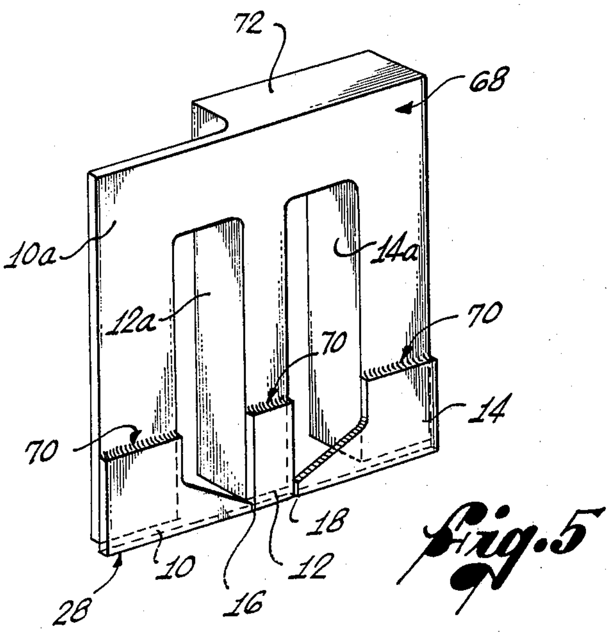
FIG. 5 is a perspective view of an alternative embodiment of the ferrite sections of a head with the erase and read-write coils being eliminated for simplicity.
Figure 6:
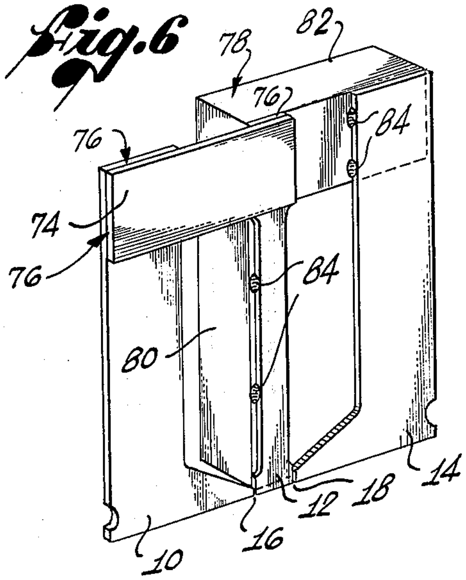
FIG. 6 is a perspective view of a second alternate embodiment of the ferrite sections of a head again with the erase and read-write coils eliminated for simplicity.

FIGS. 5 and 6 illustrate alternate constructions for the pole pieces of a combined wide-erase and read-write head constructed in accordance with the present invention. The coils 20 and 22 are not shown on the ferrite sections to emphasize the physical construction of the heads. In FIG. 5, the basic read-write pole piece 10, the common pole piece 12 and the erase pole piece 14 are constructed relatively short and a coil carrying subassembly 68, which need not be as thin is utilized. The coils (not shown) are first attached to the subassembly 68 and then the subassembly is attached by some suitable means such as epoxy glue at 70, to the pole pieces 10, 12 and 14 so that the subassembly does not extend to the recording surface 28. Thus the more difficult assembly and handling phases of constructing the head may be done on the subassembly 68 and the cross-section of the material in the erase magnetic circuit of the head may be advantageously increased to improve the efficiency of the erase field. This is illustrated by the enlarged common pole piece 12*a* and erase pole piece 14*a* as well as an integral erase crossbar 72 shown in FIG. 5. However, the read-write pole piece 10*a* is thinner than the erase pole piece 14*a* to reduce read-write head leakage inductance, as is well understood in the art.

The alternate embodiment of the ferrite sections shown in FIG. 6 accomplishes much the same structural and magnetic improvements as the embodiment shown in FIG. 5 but is easier to fabricate. For this reason, the configuration shown in FIG. 6 is the presently preferred structural embodiment for a head constructed in accordance with the present invention.

The basic construction of the embodiment shown in FIG. 6 is essentially the same as that shown in FIG. 1 in that the read-write, common, and erase pole pieces 10, 12 and 14, respectively, are parallel and open ended initially. The read-write and erase pole pieces 10 and 14, respectively are long enough to directly receive and carry the read-write and erase coils (not shown) 20 and 22, respectively. However, in the embodiment shown in FIG. 6, the read-write magnetic circuit is closed by a separate read-write cross bar 74 secured to the open ends of the read-write and common pole pieces 10 and 12, respectively, on one side thereof by some suitable means such as epoxy glue along edges 76.

An "L" shaped ferrite piece 78, of increased cross-section, is employed to close the erase magnetic circuit and increase the structural integrity of the formed head. Thus the piece 78 has a common section 80 which extends along the common pole piece 12 on the side opposite the cross bar 74 and an integral erase cross bar section 82 which extends between the common and erase pole pieces 12 and 14, respectively. Again, the common section 86 does not extend to the recording surface 28. The piece 78 is also secured in place by some means such as epoxy glue at points 84. Thus, the piece 78 also increases the material cross-section of the erase magnetic circuit to increase efficiency.

In summary, the combined read-write and erase magnetic head of the present invention incorporates a long erase gap permitting erasing energy to fringe beyond the ends of the gap to erase a wider path than will be subsequently recorded over. This technique effectively prevents overlapping of closely adjacent recorded tracks which can result in cross-talk between tracks on playback. In addition, a fabrication technique is employed which strengthens the head structure and also increases the efficiency of the magnetic circuits in the head.

While a presently preferred embodiment of the recording head of the present invention has been described in detail, as well as alternate embodiments for the construction thereof, it should be appreciated that many alternate forms of construction may be employed using the novel techniques disclosed. Therefore, the scope of the invention is not to be limited except by the following claims.

I claim:

1. A combined erase and read-write magnetic head, comprising:

an elongated magnetic recording surface having a longitudinal dimension and a substantially constant width transverse to said longitudinal dimension;

an erase magnetic circuit having an erase gap in said recording surface, the length of said gap being along said longitudinal dimension of said surface and the width of said gap being transverse to said longitudinal dimension across the entire width of said surface, said erase gap being sufficiently long compared to said width of said erase gap to permit the generation of effective erasing magnetic fields beyond the ends of said width of said erase gap;

a read-write magnetic circuit having a read-write gap in said recording surface spaced from said erase gap, the length of said read-write gap being in the direction of said longitudinal dimension and the width of said read-write gap being transverse to said longitudinal dimension across the entire width of said surface and substantially the same width as said erase gap, said erase magnetic circuit and said read-write magnetic circuit having a common magnetic path between said erase gap and said read-write gap.

2. The combined erase and read-write magnetic head defined in claim 1 including:

an erase pole piece in said erase magnetic circuit;

a read-write pole piece in said read-write magnetic circuit;

a common pole piece in both said erase and said read-write magnetic circuits; and a cross piece for closing said erase and said read-write magnetic circuits, said cross piece being mounted across said erase pole piece, said read-write pole piece and said common piece at ends thereof opposite said erase and said read-write gaps.

3. The combined erase and read-write magnetic head defined in claim 2 including:

an erase coil mountable on said erase pole piece;

a read-write coil mountable on said read-write pole piece; said erase coil and said read-write coil being mounted on said erase pole piece and said read-write pole piece prior to mounting said cross piece across said pole pieces.

4. The combined erase and read-write magnetic head defined in claim 2 wherein:

said common pole piece is of increased cross-sectional area compared to said erase and said read-write pole pieces.

5. A combined erase and read-write magnetic head, comprising:

an elongated magnetic recording surface having a longitudinal dimension and a substantially constant width transverse to said longitudinal dimension;

an erase magnetic circuit having an erase gap in said recording surface, the length of said gap being along said longitudinal dimension of said surface and the width of said gap being transverse to said longitudinal dimension across the entire width of said surface, said erase gap being sufficiently long compared to said width of said erase gap to permit the generation of effective erasing magnetic fields beyond the ends of said width of said erase gap;

a read-write magnetic circuit having a read-write gap in said recording surface spaced from said erase gap, the length of said read-write gap being in the direction of said longitudinal dimension and the width of said read-write gap being transverse to said longitudinal dimension across the entire width of said surface and substantially the same width as said erase gap, said erase magnetic circuit and said read-write magnetic circuit having a common magnetic path between said erase gap and said read-write gap;

an erase pole piece in said erase magnetic circuit;

a read-write pole piece in said read-write magnetic circuit;

a common pole piece in both said erase and said read-write magnetic circuits;

an auxiliary common pole piece member mounted on said common pole piece to increase the cross-sectional area thereof; and a cross piece for closing said erase and said read-write magnetic circuits, said cross piece being mounted across said erase pole piece, said read-write pole piece and said common piece at ends thereof opposite said erase and said read-write gaps.

6. A combined erase and read-write magnetic head, comprising:

an elongated magnetic recording surface having a longitudinal dimension and a substantially constant width transverse to said longitudinal dimension;

an erase magnetic circuit having an erase gap in said recording surface, the length of said gap being along said longitudinal dimension of said surface and the width of said gap being transverse to said longitudinal dimension across the entire width of said surface, said erase gap being sufficiently long compared to said width of said erase gap to permit the generation of effective erasing magnetic fields beyond the ends of said width of said erase gap;

a read-write magnetic circuit having a read-write gap in said recording surface spaced from said erase gap, the length of said read-write gap being in the direction of said longitudinal dimension and the width of said read-write gap being transverse to said longitudinal dimension across the entire width of said surface and substantially the same width as said erase gap, said erase magnetic circuit and said read-write magnetic circuit having a common magnetic path between said erase gap and said read-write gap;

an erase pole piece in said erase magnetic circuit;

a read-write pole piece in said read-write magnetic circuit;

a common pole piece in both said erase and read-write magnetic circuits;

an auxiliary magnetic piece attached to said erase pole piece and said common pole piece, said auxiliary piece both closing said erase magnetic circuit and increasing the cross-sectional area of said common pole piece; and a cross piece for closing said read-write magnetic circuit, said cross piece being mounted between said read-write pole piece and said common piece.

7. The combined erase and read-write magnetic head defined in claim 6, including:

an erase coil mounted on said erase pole piece;

a read-write coil mounted on said read-write pole piece, said erase coil and said read-write coil being mounted on said erase pole piece and said read-write pole piece prior to mounting said auxiliary erase magnetic piece and said cross piece.

8. A combined erase and read-write magnetic head, comprising:

an elongated magnetic recording surface having a longitudinal dimension and a substantially constant width transverse to said longitudinal dimension;

an erase magnetic circuit having an erase gap in said recording surface, the length of said gap being along said longitudinal dimension of said surface and the width of said gap being transverse to said longitudinal dimension across the entire width of said surface, said erase gap being sufficiently long compared to said width of said gap to permit the generation of effective erasing magnetic fields beyond the ends of said width of said erase gap;

a read-write magnetic circuit having a read-write gap in said recording surface spaced from said erase gap, the length of said read-write gap being along said longitudinal dimension and the width of said read-write gap being transverse to said longitudinal dimension across the entire width of said surface and substantially the same width as said erase gap;

an erase pole piece;

a read-write pole piece;

a common pole piece, said erase pole piece, said read-write pole piece and said common pole piece having elongated members spaced and substantially parallel to each other with said erase gap being formed between ends of said erase pole piece and said common pole piece and said read-write gap being formed between said read-write pole piece and said common pole piece;

an erase coil mounted around said erase pole piece;

a read-write coil mounted around said read-write pole piece;

an auxiliary magnetic piece having an elongated member mounted along said common pole piece and across member mounted across the open ends of said erase pole piece and said common pole piece to increase the magnetic cross-sectional area of said common pole piece and close said erase magnetic circuit;

a cross piece mounted across the open ends of said read-write pole piece and said common pole piece to close said read-write magnetic circuit.

9. The combined erase and read-write magnetic head defined in claim 8, wherein:

said length of said erase gap is approximately one-half of the width of said elongated surface.

* * * * *